United States Patent [19]
Nessi et al.

[11] Patent Number: 5,469,096
[45] Date of Patent: Nov. 21, 1995

[54] POWER-TRANSISTOR SLEW-RATE CONTROLLER EMPLOYING ONLY A SINGLE CAPACITOR PER HALF-BRIDGE

[75] Inventors: Maurizio Nessi, Como; Giona Fucili, Magenta, both of Italy

[73] Assignee: SGS-Thomson Microelectronics, S.r.l., Milan, Italy

[21] Appl. No.: 251,693

[22] Filed: May 31, 1994

[30] Foreign Application Priority Data

May 31, 1993 [EP] European Pat. Off. .............. 93830247

[51] Int. Cl.⁶ .................................................. H03K 3/00
[52] U.S. Cl. .......................... 327/112; 327/108; 327/423; 363/132
[58] Field of Search ............................. 327/112, 111, 327/384, 423, 424, 588; 326/24, 83, 91, 92, 122; 363/132

[56] References Cited

U.S. PATENT DOCUMENTS

| | | | |
|---|---|---|---|
| 3,597,638 | 8/1971 | Jensen | 307/261 |
| 4,000,412 | 12/1976 | Rosenthal et al. | 307/208 |
| 4,216,388 | 8/1980 | Wilson | 307/234 |
| 4,658,190 | 4/1987 | Miyazaki et al. | 318/254 |
| 4,746,871 | 5/1988 | de La Plaza | 328/127 |
| 4,806,880 | 2/1989 | Laws | 331/8 |
| 4,823,029 | 4/1989 | Gabara | 307/443 |
| 4,879,522 | 11/1989 | Mattfeld | 330/263 |
| 5,191,269 | 3/1993 | Carbolante | 318/254 |
| 5,237,222 | 8/1993 | Koblitz et al. | 307/490 |
| 5,289,051 | 2/1994 | Zitta | 307/270 |
| 5,311,150 | 5/1994 | Engbretson et al. | 331/59 |

FOREIGN PATENT DOCUMENTS 090423 10/1983 European Pat. Off. .

*Primary Examiner*—Timothy P. Callahan
*Assistant Examiner*—Kenneth B. Wells
*Attorney, Agent, or Firm*—Robert Groover; Betty Formby

[57] ABSTRACT

In a half-bridge output stage employing a complementary pair of output power transistors, each driven through an integrating stage for controlling the slew-rate, a single integration capacitance is conveniently shared by the two integrating stages that drive the power transistors. A pair of switches connect the single integrating capacitance to the input of either one of the two integrating stages and are controlled by a pair of nonoverlapping signals that have a certain advance with respect to the pair of logic signals that drive the half-bridge stage. In the case of a driving system of a multi-phase machine, the two configuring switches of the single integration capacitor may be driven by a pair of control signals that drive a different phase winding of the multi-phase machine, thus eliminating the need for dedicated circuitry for generating said pair of anticipated signals to control the configuration switches.

23 Claims, 3 Drawing Sheets

POWER-TRANSISTOR SLEW-RATE CONTROLLER EMPLOYING ONLY A SINGLE CAPACITOR PER HALF-BRIDGE

CROSS-REFERENCE TO RELATED APPLICATION

This application claims priority from European application 93830247.8, filed May 31, 1993.

BACKGROUND AND SUMMARY OF THE INVENTION

This invention relates to a slew-rate controller of power transistors in a half-bridge output stage employing a complemetary transistor pair.

When driving inductive loads in a switching mode, abrupt changes of current in the windings may cause electromagnetic emissions, besides causing torque discontinuities in electric motors that cause noisy operation.

A typical situation is illustrated in FIG. 1, which shows three separate half-bridge output stages, each driving one winding (L1, L2, L3) of a three-phase brushless DC motor. If, for example, it is necessary to switch the current from the power transistor M1 to the power transistor M2, an abrupt turn-off of M1 makes the inductance of the winding L1 discharge on the supply rail through the diode D4. This causes a drop in the current through the sensing resistance Rs of the control system, and a consequent change in the current passing through the excitation winding of the motor. In fact, the current regulating circuit will respond to keep the voltage across the sensing resistance Rs constant, by changing the bias conditions of the output transistors thus altering the current in the motor windings. This causes an undesirable variation of the torque.

However, the injection of the discharge current of the winding's inductance on the supply rail may cause disturbances on the line. It is common knowledge that these problems may be considerably reduced by controlling the turn-off time of the power transistor. In doing so, the following should be taken into account:

a) the turn-off time must be long enough to allow the inductance to fully discharge; but b) an excessively long turn-off delay would negatively affect speed performance, e.g. in driving a motor.

Commonly, a turn-off slew-rate control is individually implemented for each output power transistor of the stage.

On the other hand, depending on the characteristics of the fabrication process of the integrated circuit, complementary and structurally similar architectures are highly preferable due to the advantages of simpler design and layout and higher overall performance. Moreover, a half-bridge output stage architecture employing a :pair of push-pull connected complementary power transistors (e.g. PMOS and NMOS) offers significant advantages as compared to architectures employing transistors of only one type (which, in a bridge configuration, require driving circuits that are not mirror images of each other).

An innovative slew-rate controller has now been devised, and (as disclosed herein) has proven itself particularly effective in controlling the turn-off slew-rate of the output transistors of a half-bridge stage. This controller is both extremely simple to realize, and also cost-efficient. The novel controller of the invention employs a pair of push-pull connected, complementary, power transistors. A main advantage of the novel device of the invention is that a single capacitor is shared by two structurally similar integrating stages that are used to drive the two complementary output transistors, respectively, so as to control their slew-rates during a turn-off phase. A single integrating capacitor is switched onto one or the other stage by two switches, controlled in phase opposition to each other by a pair of control signals that are suitably out-of-phase with respect to the pair of logic signals that drive the two complementary output transistors, respectively.

Another important advantage of the device of the invention, when employed in the driving circuitry of a multi-phase brushless DC motor, is that it does not require a dedicated circuit for generating the control (timing) signals for the pair of switches used in the slew-rate controller circuit. In fact, a pair of driving signals for a different excitation phase of the motor can advantageously be used for that purpose, since they are already available within the motor drive system itself.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
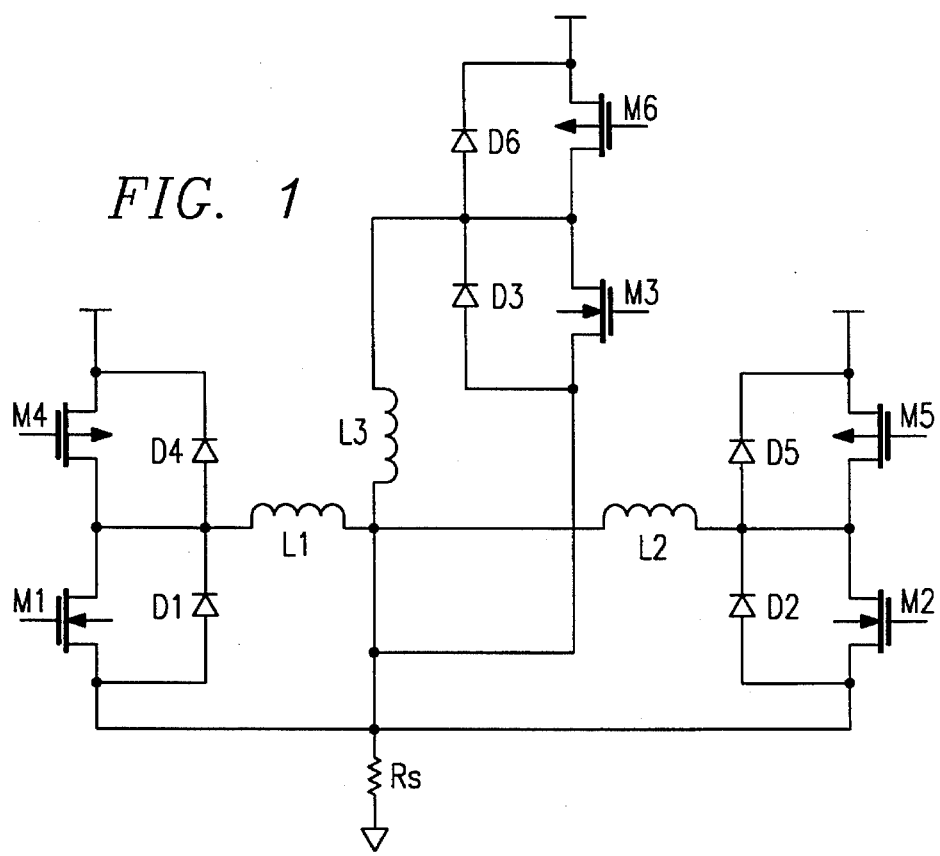
FIG. 1, as discussed above, shows a driving circuit diagram of the windings of a three-phase brushless DC motor.
Figure 2:
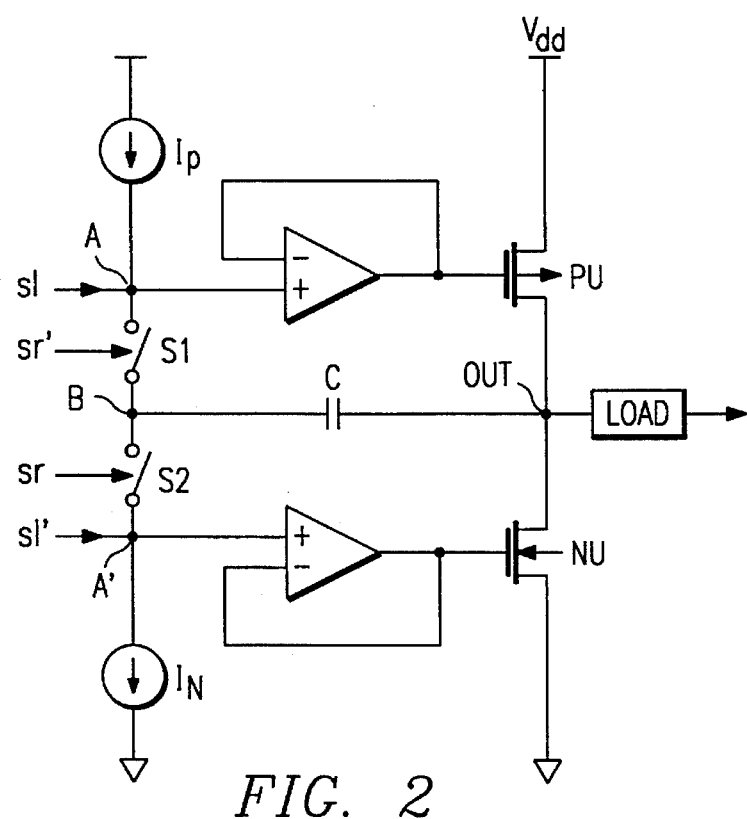
FIG. 2 shows the functional circuit diagram of a single, half-bridge stage provided with a turn-off slew-rate controller for the push-pull connected, complementary output transistor pair, according to the present invention.
Figure 3:
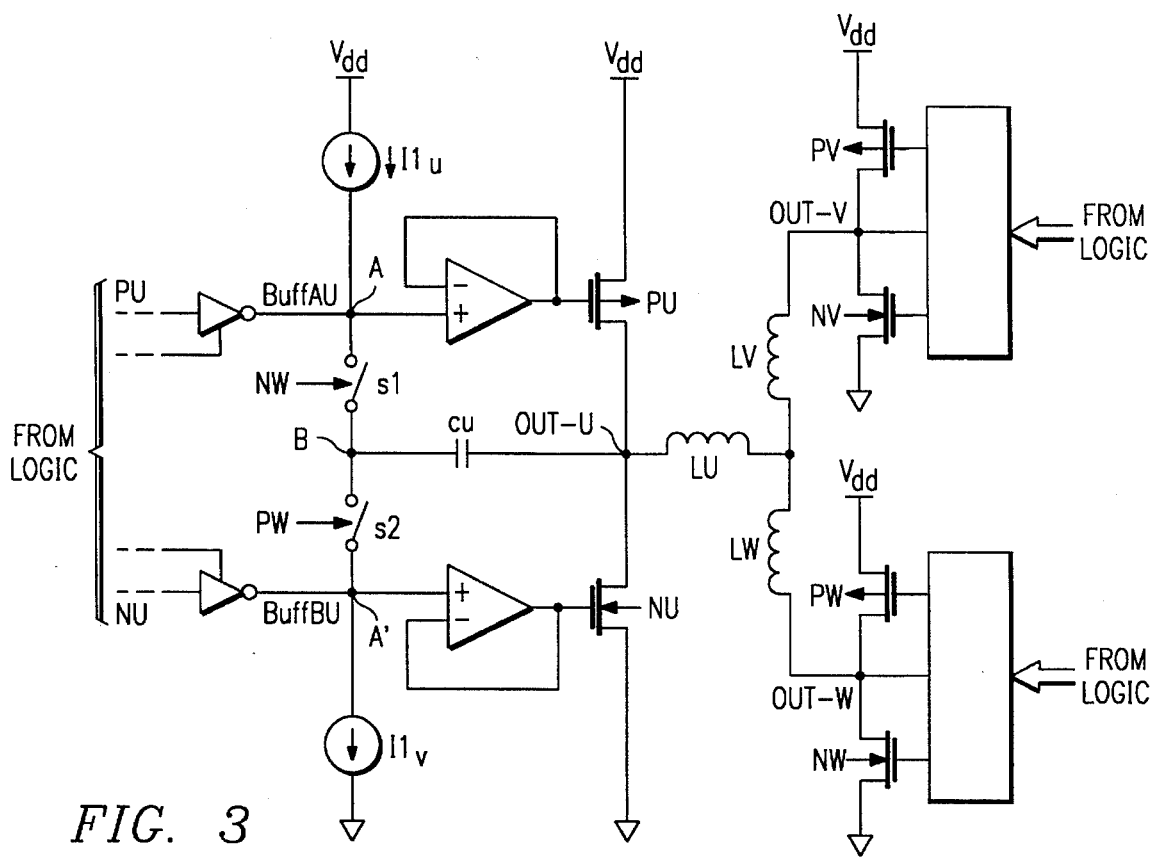
FIG. 3 shows the circuit diagram of a driving circuit of a three-phase DC brushless motor, employing three half-bridge stages with the turn-off slew-rate controller of the present invention.
Figure 4:
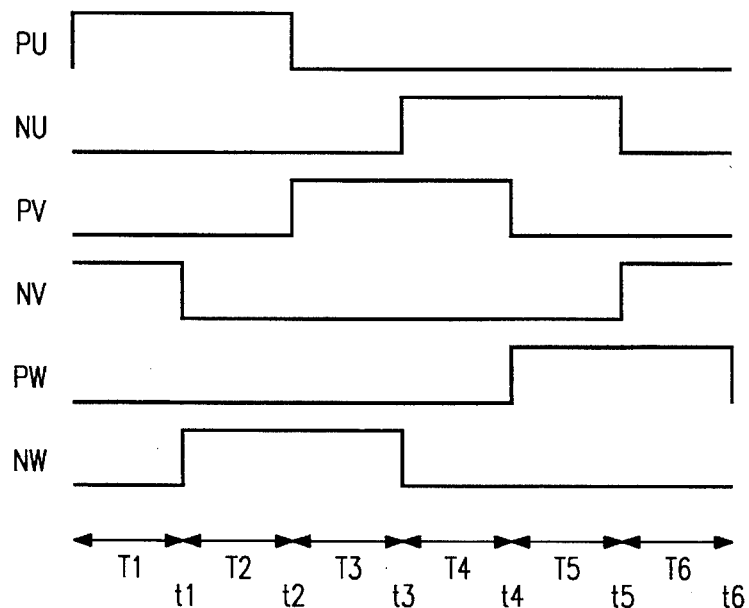
FIG. 4 shows the timing diagram of the signals (states) of the three complementary transistor pairs of the half-bridge output stages that compose the driving circuit shown in FIG. 3.
Figure 5:
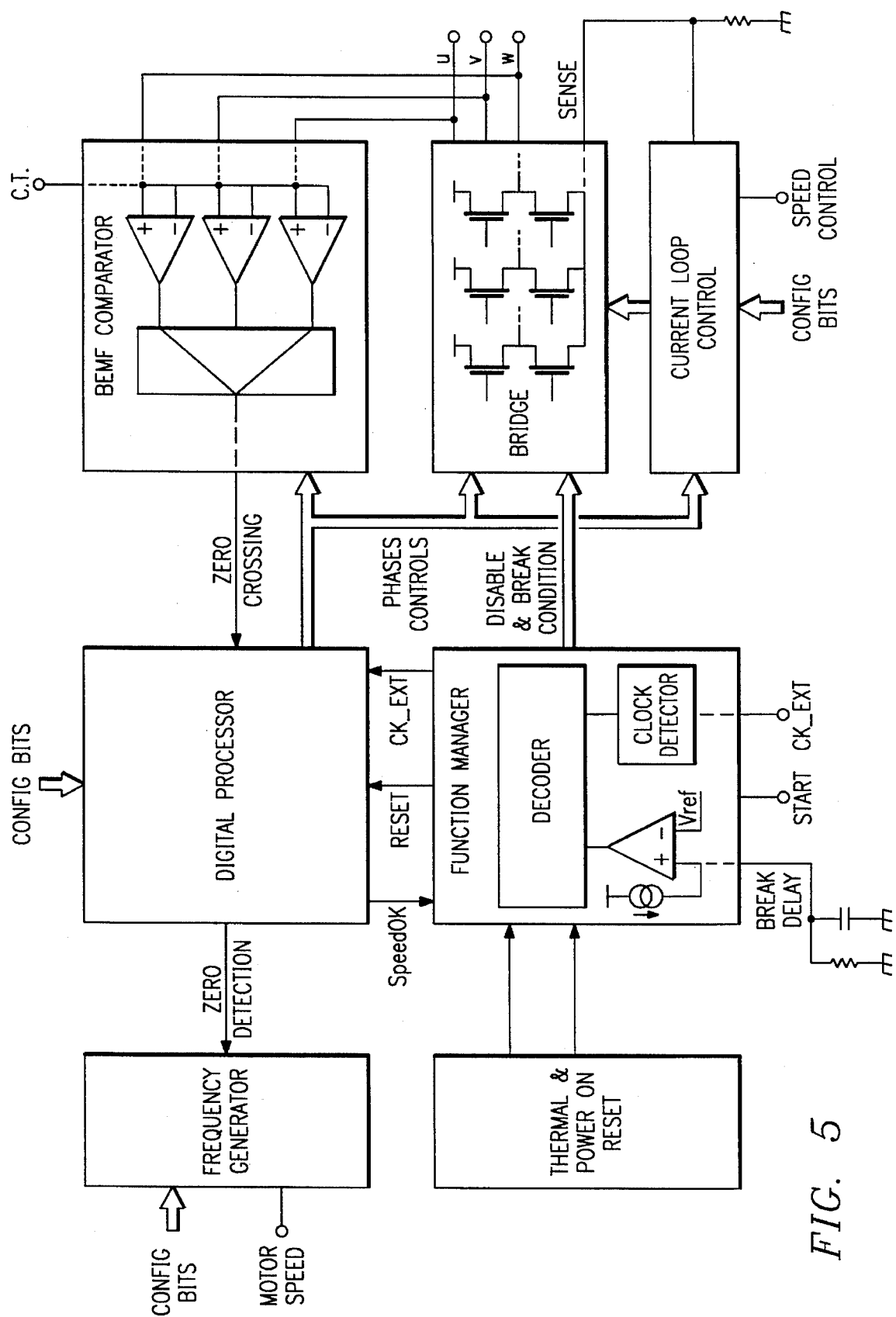
FIG. 5 shows a sample integrated circuit architecture which uses the circuitry described above.

The numerous innovative teachings of the present application will be described with particular reference to the presently preferred embodiment (by way of example, and not of limitation), in which:

A better notion of how the invented system of the invention works can be acquired by referring to the timing diagrams shown in FIG. 4, to the circuit of FIG. 3, and/or to the functional, circuit diagram of a single half-bridge stage, as shown in FIG. 2, wherein the same symbols are used, for facilitating cross-referencing.

By convention, a "low" state ("0" on a potential scale) of the signals in the timing diagrams of FIG. 4, corresponds to an OFF condition of the respective output transistor; conversely, a "high" state (Vdd potential) of a signal corresponds to an ON condition of the respective output transistor.

To simplify the explanation, only the half-bridge that drives the U-phase winding of the three-phase motor is shown in detail in FIG. 3, whereas the other two half-bridges, of the V and W phase windings, respectively, are depicted as circuit blocks. Naturally, all three half-bridge stages shown in FIG. 3 are identical and the remarks made for the U half-bridge also apply to the other two similar half-bridge circuits.

With reference to the U half-bridge, the controlled turn-off of the transistor PU must take place at instant 12, whereas the transistor NU will be turned-off at the subsequent instant 15.

The timing diagrams of FIG. 4 show how, during the interval T2 that precedes the turn-off instant 12 of the transistor PU, the state of the output transistors is the following: PU=ON, NW=ON. This means that current is passing through the Lu and Lw windings.

During the interval T2, the node A of the circuit shown in FIG. 3 is at ground potential, whereas the other terminal of capacitor CU (node OUT) is at the supply potential (Vdd) minus the ohmic voltage drop that occurs through the conducting transistor PU.

In order to prevent the CU capacitor from being at a "floating" potential at the switching instant t2 (beginning), in view of the fact that both the switches S1 and S2 are OPEN and to ensure conversely that the CU capacitor be correctly biased at a given potential, according to the working conditions of the output power transistor, S1 must be switched-on with a certain lead time with respect to the switching instant t2. For this purpose, existing logic drive signals pertaining to a different phase winding of the motor can be conveniently used.

In fact, by controlling the switch S1 with the control signal of the transistor NW, the desired prepolarization of the CU capacitor, starting from time instant t1 (during the interval T2) is ensured. This also prevents the generation of any further disturbance, since S1 actually switches at the same time as the output stages.

At the instant t2, the PU control signal determines the beginning of a turn-off phase of the PU transistor by bringing the output of the logic drive buffer BuffAU to a "tristate" condition (high output impedance). Therefore, the node A will be connected only to the generator I1, which will inject current into the terminal of the CU capacitor at the lowest-potential. The node C will thus achieve the potential that results from the following formula:

$$Vc = Vin - K*t$$

where Vin is the voltage at node C and the time constant K is determined by the ratio:

$$K = I1/CU \ (V/\mu sec)$$

In this way, the desired slew-rate control of the PU transistor during a turn-off phase is achieved. In fact, the slew-rate value will be equal to K and will be easily varied by adjusting the current I1.

By applying the signal PW that drives the PW transistor of the W half-bridge of the three-phase driving system shown in FIG. 3 to the control terminal of the switch S2, the same remarks made in connection with a turn-off phase of the PU transistor, beginning at the instant 12, also apply to a turn-off phase of the NU transistor, beginning at instant 15. In this case, a pre-polarization of the CU capacitor takes place during the interval T5 that precedes the switching instant 15, owing to an anticipated transition of the PW signal that drives the S2 switch with respect to the switching instant 15 (turn-off phase of the NU transistor).

Naturally, the slew-rate controller of the present invention, as outlined in FIG. 2, is also useful for driving mono-phase loads. Clearly, if no logic signal is available for controlling the two switches S1 and S2 of the circuit of the invention, a dedicated logic circuitry will be required for generating a pair of complementary control signals sr and sr' for controlling the switches S1 and S2 in phase opposition to each other. Common circuits can produce the required pair of signals sr and sr', having a certain advance with respect to a pair of logic signals s1 and s1' that drives the output transistor pair of the half-bridge stage.

In particular, the signals sr and sr' should preferably be two nonoverlapping signals, that is, they may both be "low" during an interval of the cycle, but in no case should they both be in a "high" logic state. Common logic timing circuits that positively exclude this occurrence are well known in the art and do not require any specific description.

Of course the scope of the claimed invention is not limited to the specific embodiments disclosed. For example, although the use of MOS power transistors is shown in the figures, this remains a matter of design choice and should not be regarded as a limitation. Bipolar transistors can be used as well.

What is claimed is:

1. A half-bridge output stage, comprising:
    a pair of complementary push-pull-connected power transistors, each transistor having a control terminal which is driven by the combination of a respective logic driving buffer with a respective integrating stage that controls the slew-rate of a respective driving signal, output by the integrating stage, connected to said control terminal;
    wherein the two integrating stages are both connected to a single shared integration capacitor, a terminal of said integration capacitor being connected to an input of only one of said integrator stages at a time by two switches controlled in phase opposition to each other by a pair of control signals that have shifted timing with respect to said pair of driving signals.

2. The half-bridge output stage of claim 1, as part of a driving circuit of a multi-phase machine, wherein said pair of signals for controlling said two switches in the pair of signals that drives the power transistors of a different half-bridge output stage of said multi-phase driving circuit.

3. The half-bridge output stage of claim 1, wherein said pair of signals that controls said switches of the shared integration capacitor are phase opposed signals which never turn said switches on simultaneously, but which keep said switches in an OFF condition during at least part of a control cycle.

4. The half-bridge output stage of claim 1, wherein said complementary transistors are field effect transistors.

5. The half-bridge output stage of claim 1, wherein each of said integrating stages for controlling the slew-rate comprises a buffer of which an output is connected to said respective control terminal of a respective one of said complementary power transistors, and each said integrating stage has an input node which is connected to receive a logic driving signal and which is connected to a current generator which supplies charging current to said integration capacitor.

6. A circuit for providing controlled turn-off of a pair of power transistors, including a first power transistor connected between a first power supply voltage and an output node and a second power transistor connected between a second power supply voltage and said output node, comprising:
    a first voltage follower amplifier operatively connected to drive a control terminal of said first transistor in dependence on the voltage of a first input node, and a second voltage follower amplifier operatively connected to drive a control terminal of said second transistor in dependence on the voltage of a second input node, said first and second input nodes being connected to be driven by respective digital input signals;

a first current generator connected to said first input node, and a second current generator connected to said second input node;

a first switch connected to selectably connect said first input to a common node, and a second switch connected to selectably connect said second input to said common node; and a capacitor connected between said common node and said output node;

wherein said first switch is connected to turn on after said second switch turns off and before said respective digital input signal to said first node is turned off;

and wherein said second switch is connected to turn on after said first switch turns off and before said respective digital input signal to said second node is turned off.

7. The circuit of claim 6, wherein said first and second transistors are complementary.

8. The circuit of claim 6, wherein said first and second transistors are P-channel and N-channel respectively.

9. The circuit of claim 6, wherein said switches are field effect transistors.

10. A circuit for providing controlled turn-off of a pair of complementary power transistors, including a first power transistor connected between a first power supply voltage and an output node and a second power transistor connected between a second power supply voltage and said output node, comprising:

a controlled-slew-rate amplifier operatively connected to drive a control terminal of said first transistor in accordance with the voltage of a first input node, and a second voltage follower amplifier operatively connected to drive a control terminal of said second transistor in accordance with the voltage of a second input node, said first and second input nodes being connected to be driven by respective digital input signals;

a first switch connected to selectably connect said first input to a common node, and a second switch connected to selectably connect said second input to said common node; and a capacitor connected between said common node and said output node;

wherein said first switch is connected to turn on after said second switch turns off and before said respective digital input signal to said first node is turned off;

and wherein said second switch is connected to turn on after said first switch turns off and before said respective digital input signal to said second node is turned off.

11. The circuit of claim 10, wherein said switches are field effect transistors.

12. The circuit of claim 10, wherein said first and second transistors are complementary.

13. The circuit of claim 10, wherein said first and second transistors are P-channel and N-channel respectively.

14. A motor control circuit, comprising:

a plurality of half-bridge circuits, each comprising
two transistors connected in series to drive a motor terminal connection therebetween, two controlled-slew-rate voltage follower circuits, each connected to provide a drive signal, to a respective one of said transistors, which gradually follows the voltage on a respective input node, two switches, each configured to operatively connect a respective one of said input nodes to a common node, and a capacitor connected between said common node and said motor terminal connection;

wherein each said half-bridge circuit has at least one said input node thereof connected to a control input of at least one said switch of another one of said half-bridge circuits.

15. The circuit of claim 14, wherein said two transistors are complementary.

16. The circuit of claim 14, wherein said two transistors are both field effect transistors.

17. The circuit of claim 14, wherein said switches are field effect transistors.

18. An integrated circuit with motor control outputs, comprising:

three half-bridge circuits, each comprising
two transistors connected in series to drive a motor terminal connection therebetween, two controlled-slew-rate voltage follower circuits, each connected to provide a drive signal, to a respective one of said transistors, which gradually follows the voltage on a respective input node, two switches, each configured to operatively connect a respective one of said input nodes to a common node, and a integrated capacitor connected between said common node and said motor terminal connection;

wherein each said half-bridge circuit has at least one said input node thereof connected to a control input of at least one said switch of another one of said half-bridge circuits.

19. The circuit of claim 18, wherein said two transistors are complementary.

20. The circuit of claim 18, wherein said two transistors are both field effect transistors.

21. The circuit of claim 18, wherein said switches are field effect transistors.

22. A method for providing controlled turn-off of a pair of complementary power transistors, including a first power transistor connected between a first power supply voltage and an output node and a second power transistor connected between a second power supply voltage and said output node, comprising:

using a first voltage follower amplifier to drive a control terminal of said first transistor in accordance with the voltage of a first input node, and a second voltage follower amplifier to drive a control terminal of said second transistor in accordance with the voltage of a second input node, said first and second input nodes being connected to be driven by respective digital input signals;

providing respective controlled additional currents to said first and second input nodes;

and intermittently connecting said first and second inputs to a capacitor connected to said output node, using control signals which are phase-shifted from the input signals on said first and second nodes.

23. The method of claim 22, wherein said first and second transistors are P-channel and N-channel respectively.

* * * * *